UNITED STATES PATENT OFFICE.

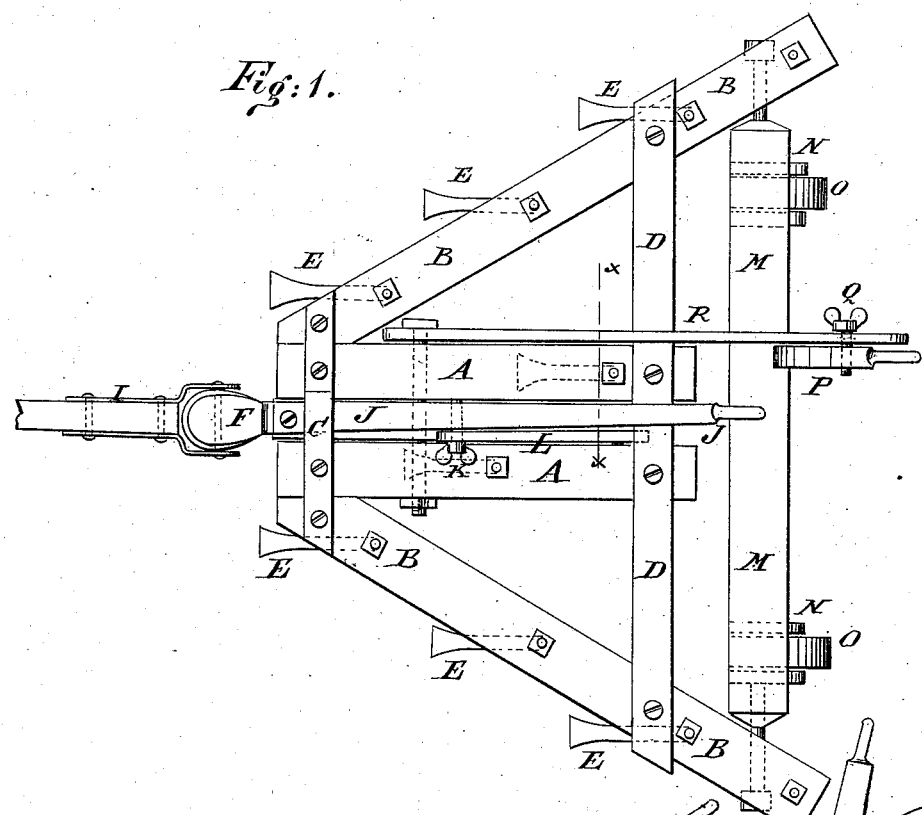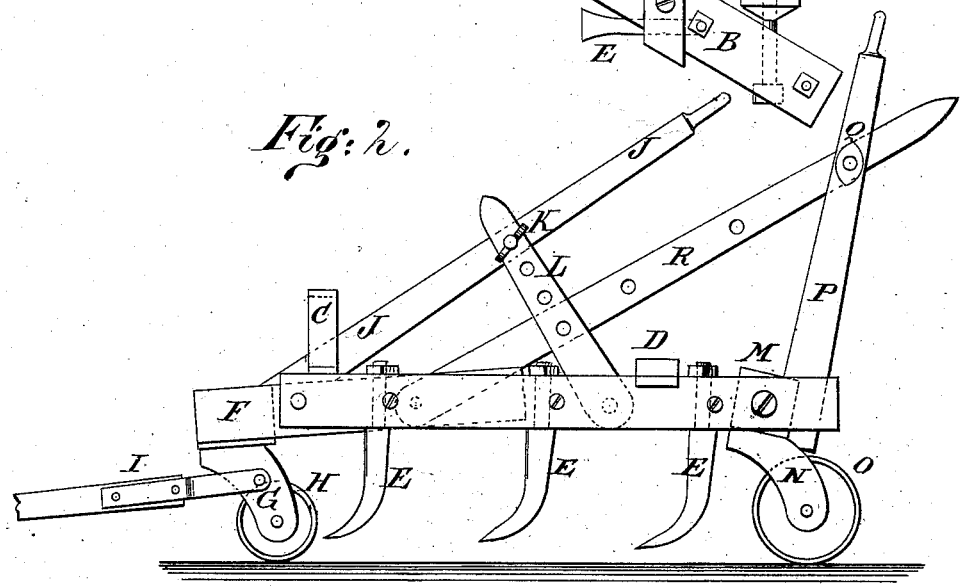

DAVID ARCHER, JR., OF BRIER HILL, NEW YORK.

IMPROVEMENT IN ADJUSTABLE WHEEL-CULTIVATORS.

Specification forming part of Letters Patent No. 194,570, dated August 28, 1877; application filed June 30, 1877.

*To all whom it may concern:*

Be it known that I, DAVID ARCHER, Jr., of Brier Hill, in the county of St. Lawrence and State of New York, have invented a new and useful Improvement in Adjustable Wheel-Cultivator, of which the following is a specification:

Figure 1 is a top view of my improved cultivator. Fig. 2 is a side view of the same. Fig. 3 is a detail section taken through the line $x\ x$, Fig. 1.

Similar letters of reference indicate corresponding parts.

The object of this invention is to furnish an improved cultivator which shall be so constructed that it may be readily adjusted to work at any desired depth in the ground, which may be raised above the ground for convenience in passing from place to place, and which shall be simple in construction, convenient in use, and effective in operation.

The invention will first be described in connection with drawing, and then be pointed out in the claim.

A are two longitudinal beams, placed parallel with each other, and at a little distance apart. To the outer side of the forward end of each of the beams A is attached the beveled forward end of an inclined beam, B. The rear ends of the four beams A B are connected by a cross-bar, D, and their forward ends are connected by a metallic cross-bar, C, the middle part of which, over the space between the beams A, is arched. To the beams A B are attached the teeth E, which pass up through the said beams, have shoulders formed upon them to rest against the lower side of the beams, and have nuts screwed upon their ends. The lower ends of the teeth E are curved forward, as shown in Fig. 2, and are flattened, as shown in Figs. 1 and 3. To and between the forward parts of the bars A is pivoted the bar F, the forward end of which projects, and has the standard G of a caster-wheel, H, pivoted to it. To the standard G is also pivoted the branched rear end of the tongue J, to which the draft is applied. To the upper side of the forward part of the bar F is attached the beveled lower end of the lever J, which passes back through the arch of the bar D, and inclines upward. In the lever J is formed a hole to receive the screw bolt or pin K, that also passes through a hole in the bar L, the lower end of which is pivoted to one of the beams A. Several holes are formed in the bar L and in the lever J, either or both, to receive the screw bolt or pin K, so that the bar F may be adjusted to allow the teeth E to enter the ground to any desired depth, or to raise them above the ground, as may be desired. The rear ends of the inclined beams B project in the rear of the beams A, and to them are pivoted the ends of a cross-shaft, M, to the lower side of which are attached the standards N of the wheels O. To the shaft M is attached the end of a lever, P, in the upper part of which is formed a hole to receive the screw bolt or pin Q, that also passes through a hole in the bar R, the lower end of which is pivoted to one of the beams A. Several holes are formed in the bar R and lever P, either or both, to receive the screw bolt or pin Q, to enable the wheels O to be adjusted to cause the teeth E to enter the ground to any desired depth, or to raise them above the ground, as desired.

Having thus described my invention, I claim as new and desire to secure by Letters Patent—

The combination, in a cultivator, of the tongue I and standard G, having wheel H, with the front bar F, pivoted between beams A A, and provided with lever J, as and for the purpose specified.

DAVID ARCHER, JR.

Witnesses:
H. L. STARKWEATHER,
B. E. MEAD.